United States Patent [19]

Frieder et al.

[11] Patent Number: 4,573,776

[45] Date of Patent: Mar. 4, 1986

[54] BICONVEX APHAKIC PROSTHETIC LENS

[75] Inventors: Philip M. Frieder, Miami; Edward deRojas, Lauderhill, both of Fla.

[73] Assignee: Optical Systems International Inc., Hialeah, Fla.

[21] Appl. No.: 560,165

[22] Filed: Dec. 12, 1983

[51] Int. Cl.$^4$ .......................... G02B 3/04; G02C 7/02
[52] U.S. Cl. ...................................... 351/167; 350/432
[58] Field of Search ............................... 351/167, 159; 350/432–435

[56] References Cited

U.S. PATENT DOCUMENTS 3,771,858  11/1973  Bivens ........................... 351/168 X
4,073,578  2/1978   Welsh ............................... 351/167

FOREIGN PATENT DOCUMENTS 439620  9/1948  Italy ................................................ 167/

*Primary Examiner*—John K. Corbin
*Assistant Examiner*—Scott J. Sugarman
*Attorney, Agent, or Firm*—Jack E. Dominik

[57] ABSTRACT

This invention relates to a reduced magnification, thinner lens structure, and improved vision for an aphakic patient by biconvexing the lens with the occular side of the lens having a correction of +0.25 to +6.00 diopters, and offsetting the tunnel vision effect by a high degree of asphericity and thinning of the lens outside of the central zone on the front of the lens. The lenses are nominally manufactured from four standard blanks of +8 diopters for use with prescriptions between +8.5 and +10.75; a +10 diopter blank for use with prescriptions of +11 through +12.75 diopters correction; a +12 diopter central blank for prescriptions of +13 through +14.75 diopters correction; and a +14 diopter central blank for use with corrections of +14.75 through +20. In each instance the balance of the correction is applied by convexing the ocular surface +0.25 to +6.00 diopters. The asphericity at 60 millimeters on the front base curve of +8.00 is −3 diopters; for a +10 front base curve −5.5 diopters; for a +12 base curve −8 diopters; and for a +14 base curve −9 diopters. The respective values at 53 millimeters which may be an average size lens are for the foregoing sequence −2.25; −4.25; −5.25; and −7. A 32 mm round seg for bifocal correction may be precast into the lens blank close to the central zone. It is a base down prism and thus forces the image towards the apex. The correction varies +2 to +5 in 0.25 diopter steps.

4 Claims, 5 Drawing Figures

BICONVEX APHAKIC PROSTHETIC LENS

FIELD OF THE INVENTION

The present invention relates to an improved optical lens for patients typically after cataract surgery.

SUMMARY OF THE ART

Many aphakic spectacle lenses have been developed, most of which are characterized by a highly curved front face looking something like a flashlight lens and unattractive in appearance. Welsh U.S. Pat. No. 4,073,578 is exemplary of an early improvement in the subject lenses directed toward a modest amount of asphericity outside the central zone. More recently Frieder U.S. Pat. No. 4,185,897 corrected central and peripheral vision for the rotating eye in addition to the centrally fixed eye. Other lens designs have been developed to provide a smaller central vision field in order to reduce thickness. Exemplary of such lenses are the full view, and supermodular aspheric lens designs of American Optical Company and Silor Optical, respectively.

With the lens power in the order of 8 to 20 diopters achieved for the necessary prescription for any aphakic patient, automatically a magnification is induced. In essence, it is an unwanted side effect coming from the bulging profile and extreme lens thickness needed to achieve the necessary focus power. This can be observed in the patient where he will reach for a handle for a coffee cup, and clutch his fingers short of actual contact. This side effect is known as unwanted abnormal induced magnification. The formula for magnification can be calculated as follows:

$$M = \frac{1}{1 - \frac{d}{n} F_2} \cdot \frac{1}{1 - z F_v}$$

wherein M=magnification; d=center thickness; n=index of refraction; $F_2$=front base curve; $F_1$=ocular surface base curve; z=vertex distance (from the front curve of the lens to the front surface of the cornea); and $F_V$=lens power.

The lens power, $F_V$ is determined by the eye doctor who examines the patent to determine the necessary lens power which will be needed to bring the light to a focus on the retina in the rear portion of the eye. This $F_V$ factor is a function of the size and the shape of the eye. The $F_V$ factor is a variable in the above formula for magnification, but it is beyond the control of the eye care professionals, including opticians, optometrists, ophthamologists, manufacturers, and laboratory lens processors. The other factors, including lens thickness, front base curve, and vertex fitting distance, are controllable. Because of certain available materials, more specifically CR39 having an index of refraction of 1.497, the index of refraction portion of the subject formula is also fairly well determined. Desirably a higher index of refraction lens material will also reduce magnification, but within the lens materials of the present state of the art such materials are not workable or readily available.

Further in noting the formula for magnification, it becomes apparent that to reduce magnification the center thickness should be reduced. Also the front base curve should be reduced. Finally the vertex distance (z) should also be reduced. Therefore to produce the ideal aphakic lens minimizing magnification, all three of these elements should be reduced.

SUMMARY

The present invention achieves reduced magnification, thinner lens structure, and improved vision for an aphakic patient by biconvexing the lens with the ocular side of the lens having a correction of +0.25 to +6.00 diopters, and offsetting the tunnel vision effect by a high degree of asphericity and thinning of the lens outside of the central zone on the front of the lens. The lenses are nominally manufactured from four standard blanks of +8 diopters for use with prescriptions between +8.5 and +10.75; a +10 diopter blank for use with prescriptions of +11 through +12.75 diopters correction; a +12 diopter central blank for prescriptions of +13 through +14.75 diopters correction; and a +14 diopter central blank for use with corrections of +14.75 through +20. In each instance the balance of the correction is applied by convexing the ocular surface +0.25 to +6.00 diopters. The asphericity at 60 millimeters on the front base curve of +8.00 is −3 diopters; for a +10 front base curve −5.5 diopters; for a +12 base curve −8 diopters; and for a +14 base curve −9 diopters. The respective values at 53 millimeters which may be an average size lens are for the foregoing sequence −2.25; −4.25; −5.25; and −7. A 32 mm round seg for bifocal correction may be precast into the lens blank close to th central zone. It is a base down prism and thus forces the image towards the apex. The correction varies +2 to +5 in 0.25 diopter steps.

In view of the foregoing it is a principal object of the present invention to provide a lens for an aphakic patient having minimized and tolerable magnification characteristics.

A related object of the present invention is to provide a lens for an aphakic patient which in addition to reducing magnification to a tolerable level, is thinner and therefore lighter in weight and aesthetically more appealing.

A further object of the present invention is to provide a lens achieving the above advantages which can be made from modular assortment of base lens blanks, and produced economically for a wide variety of prescriptions.

DESCRIPTION DRAWINGS

Further objects and advantages of the present invention will become apparent as the following description proceeds, taken in conjunction with the accompanying illustrative drawings, in which.

Figure 1:
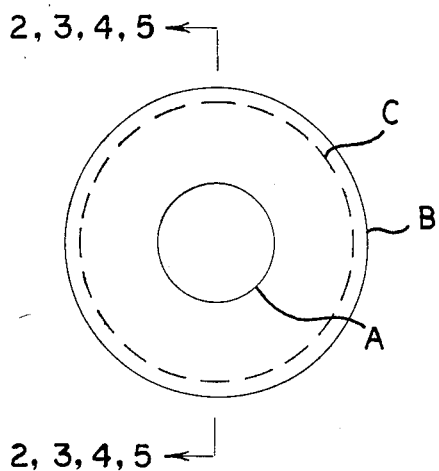
FIG. 1 is a front elevation of a typical 60 millimeter lens blank having a central vision area.
Figure 3:
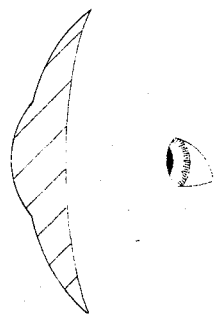
FIG. 3 is a transverse sectional view of the lens blank taken along section line 3—3 of FIG. 1 but showing the ocular surface having a concave configuration.
Figure 4:
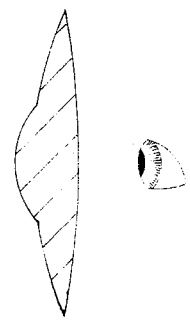
Figure 5:
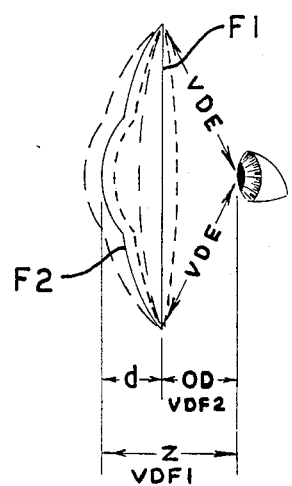

FIG. 4 is a transverse sectional view taken along section line 4—4 of FIG. 1 showing an illustrative cross-section of the present invention having a biconvex surface, the ocular surface being convex; and FIG. 5 is a semi-diagrammatic overlay view taken along section line 5—5 of FIG. 1, but overlaying the lens constructions of FIGS. 2, 3 and 4 and showing various characteristics in letter and number form which will be explained in the description which follows.

DESCRIPTION OF A PREFERRED EMBODIMENT

Turning back to the summary, and the statement of the prior art where the formula for magnification was developed, it becomes apparent that the ocular biconvex surface is necessary to achieve prescription powers on a much flatter front curve than those used in the prior art. By flattening the front base curve of the lens, the value of $F_1$ in the formula is reduced and accordingly magnification is reduced. In addition, by adding the convexity to the ocular surface, the center thickness is reduced, and also the vertex distance from the front curve of the lens to the front surface of the cornea. To overcome the tunnel vision effect of these features, a high level of asphericity is employed from the central zone A of FIG. 1 to the outer edge of the 60 millimeter blank B of FIG. 1. The dotted showing in FIG. 1 identified with the reference C is the approximate size of most lenses of 53 millimeters.

The asphericity takes on the following formula depending upon the front base curve, four of which are intended:

| Front Base Curve | Amount of Asphericity of 60 mm. | 53 mm. |
| --- | --- | --- |
| +8.00 D. | −3.00 D. | −2.25 |
| +10.00 D. | −5.50 D. | −4.25 |
| +12.00 D. | −8.00 D. | −5.25 |
| +14.00 D. | −9.00 D. | −7.00 |

Thus the +12.00 D lens is +4 D at the sixty mm edge and +6.75 at the edge of a 53 mm lens.

As will be seen the amount of asphericity at 53 millimeters is shown in the right-hand column, but it is determined by the amount of asphericity to be applied based upon the calculations of the 60 millimeter blank.

The Method

The method of producing the subject lenses begins first with the development of four blanks. These blanks are 60 millimeters in diameter and contain a central zone A of 25 millimeters. The central zone intended for corrections of 8.5 through 10.75 are ground to a correction of 8 diopters. The second set of blanks intended for a correction of 11 through 12.75 are ground to 10 diopters. The third set of blanks in the correction range of 13 through 14.75 are ground to 12 diopters and the central zone intended for corrections of 15 through 20 diopters are ground to 14. When the prescription is received, a blank is selected conforming to the above range. Thereafter the occular surface is ground with the appropriate amount of plus correction. For example if a 9.5 correction is indicated, the 8 diopter central zone blank of 60 millimeters in diameter is ground to a nominal +1.5 on the ocular surface. By "nominal" it is meant that there will be minor adjustments due to thickness and the index of refraction of the specific lens material used. Thereafter the asphericity in accordance with the above formula is applied, and since in this instance the front base curve is 8, the amount of asphericity at 60 millimeters will be 3 or a reduction of 5 diopters.

In determining the base curve selection, plus lenses having powers less than 8.5 D do not need asphericity because their changing vertex distances do not induce sufficient "effective power" errors. Excessive abnormal magnification induced by aphakic spectacle lenses having too much front curvature and "overall" thickness accounts for about 85% of the visual function problems experienced by aphakic patients. Flat or front curves, closer vertex distances, and thinner lenses induce less abnormal magnification. Flatter curved lenses can be fitted closer to the eye for better vision. In addition flatter curved lenses are thinner and therefore aesthetically more desirable, and inherently they have a lower weight.

Figure 2:
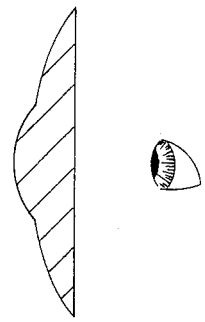
FIG. 2 is a transverse sectional view taken along section line 2—2 of FIG. 1, but showing the lens with an ocular plano surface.

The lenses of the prior art are shown in FIGS. 2 and 3 where a central zone appears, and a flattened zone of asphericity appears. The ocular surface as shown in FIG. 2 is planar, and the ocular surface shown in FIG. 3 is concave. The lens shown in FIG. 4 is illustrative of the present invention, and the showing in FIG. 5 is a superposition of the three lenses of FIGS. 2–4 inclusive.

The following Table sets forth the varying parameters of a lens made in accordance with the prior art in FIGS. 2 and 3 and also in accordance with the invention of FIG. 4 for a correction of +12 diopters:

TABLE

| | Lens Power | Front Base Cruve ($F_1$) | Ocular surface ($F_2$) | Vertex Dist. $F_1$ | Vertex Dist. $F_2$ | Induced Magnification |
| --- | --- | --- | --- | --- | --- | --- |
| FIG. 4 | +12.00 | +10.00 D | +2.00 | 13 mm | 5 mm | 11.5% |
| FIG. 2 | +12.00 | +12.00 D | 0.00 | 16 mm | 7.5 mm | 16.9% |
| FIG. 3 | +12.00 | +16.00 D | −4.00 | 20 mm | 9.5 mm | 26.1% |

As can be seen by the above, the present invention results in an induced magnification which is tolerable in the amount of 11.5%. On the other hand the typical lens of the prior art utilizing a negative three correction to the ocular surface has a magnification in the order of 26.1% which causes the patient the problems set forth, namely, total loss of depth perception to the point of having great difficulty in grasping objects.

It should be noted from FIG. 5, that all lenses are proportioned to adjust to the patient mounted on a frame that can be fitted up to the "limiting barrier". The "limiting barrier" is usually created by the length of the lashes, the protrusion of the eyebrow, in combination with the shape of the bridge of the nose. All of the lenses shown in the drawing FIGS. 1–5, and particularly the one illustrated in FIG. 5, have the limiting barrier. The limiting barrier is shown at the intersection between the item d which is the distance from the most protruding point on the front of the lens to the barrier, and in addition where the dimension OD or VDF2 which is the distance from the front of the cornea to the barrier.

EXAMPLE 1

A +12.00 D. prescription lens can be manufactured using a +10.00 D., a +12.00 D., or a +16.00 D. front base curve by changing the ocular surface so that the resultant vertex power of the lens remains +12.00 D. A +12.00 D. lens is routinely manufactured by the ophthalmic industry using a +16.00 D. front base curve combined with a −4.00 D. ocular surface. When this lens is fitted in a frame and as close as possible to the patient's eyes, then the vertex distance from the center of the lens to the eye might be in one particular patient 9.5 mm. The reason for this extra long central vertex distance measurement is that the lenses are being held by a frame at their edge and cannot be fitted closer because of the patient's physical characteristics. The sagittal depth of a −4.00 D. curve is about 2 mm. The vertex distance from the eye to the edge of this same lens is 29 mm. This means that the change in vertex distance from the center to the edge is 19.5 mm. This means that light entering throughout the lens will be focussed at different points resulting from the vertex distance moving through 19.5 mm worth of change. The lens requires a modest amount of asphericity, i.e. about 3.67 D directly resulting from a vertex distance difference of 19.5 mm.

EXAMPLE 2

Another +12.00 D. lens can be manufactured using a +12.00 D. front base curve combined with a Plano ocular surface. When this lens is fitted into the same frame as in the example above, the vertex distance from the eye to the center of the lens would be 7.5 mm. The vertex distance from the eye to the edge of the lens is still 29 mm. because the same frame is holding the same lens edge. The amount of change in the vertex distance in the example is 21.5 mm. This is wrongly considered less desirable by many ophthalmic practitioners because of the larger amount of vertex distance change. The vertex change has no significance if it is adequately and correctly aspheriezed on the front base curve. This lens will require about 4.18 D of asphericity.

EXAMPLE 3

This example represents that a +12.00 D. lens can be surfaced using a +10.00 D. front curve combined with a +2.00 D. ocular surface. When this lens is fitted into the same frame and adjusted in the same way as the above two examples, the vertex distance from the eye to the center of the lens will only be 5 mm because of the convexity of the ocular surface. The vertex distance from the eye at the edge of the lens remains 29 mm due to the frame still being fitted in the same position. The amount of change of vertex distance from the center to the edge in this example is 24 mm. This lens requires 4.25 diopters of asphericity at a diameter of 53 mm or 5.5 diopters of asphericity at 60 mm. This is much more asphericity than ever contemplated by the prior art, since the prior art never considered the importance of mangification but opted to conclude that with lesser amounts of changing vertex distances of plano and concave ocular surfaces were preferable.

All of the above Example 3 type lenses have minimized the sagittal and tangential errors of marginal stigmatism and spherical aboration which cause 10% of the aphakic problems. The majority of the aphakic patient problems, however, and the magnitude of 85% result from large amounts of induced and unwanted abnormal magnification. By combining a large amount of asphericity on a flattened front base with a convex ocular surface, unwanted magnification is significantly reduced.

The following Table summarizes generally, bearing in mind that more than 4 base curves may be interposed in the grouping:

TABLE

| Correction | BASE CURVE SELECTION CHART | |
|---|---|---|
| | Nominal Ocular | Front Surface |
| +8.50 | +.50 | 8.00 |
| +8.75 | +.75 | 8.00 |
| +9.00 | +1.00 | 8.00 |
| +9.25 | +1.25 | 8.00 |
| +9.50 | +1.50 | 8.00 |
| +9.75 | +1.75 | 8.00 |
| +10.00 | +2.00 | 8.00 |
| +10.25 | +2.25 | 8.00 |

TABLE-continued

| Correction | BASE CURVE SELECTION CHART | |
|---|---|---|
| | Nominal Ocular | Front Surface |
| +10.50 | +2.50 | 8.00 |
| +10.75 | +2.75 | 8.00 |
| +11.00 | +1.00 | 10.00 |
| +11.25 | +1.25 | 10.00 |
| +11.50 | +1.50 | 10.00 |
| +11.75 | +1.75 | 10.00 |
| +12.00 | +2.00 | 10.00 |
| +12.25 | +2.25 | 10.00 |
| +12.50 | +2.50 | 10.00 |
| +12.75 | +2.75 | 10.00 |
| +13.00 | +1.00 | 12.00 |
| +13.25 | +1.25 | 12.00 |
| +13.50 | +1.50 | 12.00 |
| +13.75 | +1.75 | 12.00 |
| +14.00 | +2.00 | 12.00 |
| +14.25 | +2.25 | 12.00 |
| +14.50 | +2.50 | 12.00 |
| +14.75 | +2.75 | 12.00 |
| +15.00 | +1.00 | 14.00 |
| +15.25 | +1.25 | 14.00 |
| +15.50 | +1.50 | 14.00 |
| +15.75 | +1.75 | 14.00 |
| +16.00 | +2.00 | 14.00 |
| +17.00 | +3.00 | 14.00 |
| +18.00 | +4.00 | 14.00 |
| +19.00 | +5.00 | 14.00 |
| +20.00 | +6.00 | 14.00 |

In addition cataract patients having had surgery on one eye only, and having their other eye normal and with good vision, will for the first time be able to have both eyes correctly prescribed and continue using them with the same pair of eyeglasses. Spectacles made from the prior art all induce so much magnification that the brain cannot tolerate the tremendously different images received from the phakic and aphakic eyes. Usually the brain objects by giving double vision.

Ophthalmic practitioners have always used an overcorrected balancing lens to block out the vision of the phakic eye so that the newly operated aphakic eye can be used.

The present invention eliminates the problem of intolerable unwanted magnficiation and therefore the brain is enabled to suppress one eye and alternatingly receive the use of both. Binolcular vision cannot be expected in these cases because the object displacement differentials created by the huge differences in prescription powers cannot be avoided. Patients will however receive tremendous benefits from having the use of both eyes monocularly. Patients will have bilateral vision, not binocular vision.

Variables and Equivalents

It will be appreciated that utilizing lens materials other than CR 39 and having a different index of refraction can be readily calculated to fall within the parameters set forth above. If the index of refraction is greater than that of CR39a at 1.497, even flatter lenses can be developed having reduced magnification. The development of such materials is within the contemplation of the invention as it can only improve the characteristics of the lens made in accordance with the teachings of this invention.

All optical measurements set forth are to be read with a Geneva Seg Clock whose 3 feet are a total of 13 mm apart to conform with the directions and examples given. The measurements given are all radial measurements.

In addition it will be appreciated that four basic lens blanks are outlined here for striking a compromise between manufacturing economies, inventory control, and patient assistance. When lens blanks at each diopter are developed, then the amount of plus correction on the ocuar convex surface will remain essentially the same or in an ascending scale depending upon the ascending amount of total correction prescribed.

What is claimed is:

1. An aphakic lens having a front surface, an ocular surface, and a central zone of a predetermined convex correction in an amount from 8 to 24 diopters characterized by:

a convex correction on the ocular surface in the range of +0.25 to 6.00 diopters to add to the front base curve corrections, and a flattening rate in the asphericity from the central zone based upon a 60 millimeter lens in accordance with the following formula:

| Front Base Curve | Power at Edge of 60 mm Lens |
| --- | --- |
| +8.00 D. | +5.00 D. |
| +10.00 D. | +4.50 D. |
| +12.00 D. | +4.00 D. |
| +14.00 D. | +5.00 D. | whereby the front base curve of a 60 mm lense is flattened to about +5.00 diopters at the edge and when added to the ocular correction the diopter drop per millimeter is between about 0.4 and 0.9.

2. A biconves aphakic lens having a front surface, and an ocular surface, and a central zone of a given prescription comprising, in combination, a convex correction on the ocular surface providing the difference between the correction on the central zone and the prescription, and a flattening rate in the asphericity from the central zone based upon a 60 millimeter lens in accordance with the following formula:

| Front Base Curve | Power at Edge of 60 mm Lens |
| --- | --- |
| +8.00 D. | +5.00 D. |
| +10.00 D. | +4.50 D. |
| +12.00 D. | +4.00 D. |
| +14.00 D. | +5.00 D. | whereby the front base curve of a 60 mm lens is flattened to about +5.00 diopters at the edge and when added to the ocular correction the diopter drop per millimeter is between about 0.4 and 0.9.

3. In the aphakic lens of claim 2 above, the asphericity ratio to the front base curve in accordance with the following table:

| Front Base Curve | Power at Edge of a 60 mm Lens | Power at Edge of a 53 mm Lens |
| --- | --- | --- |
| +8.00 D. | +5.00 D. | +5.75 D. |
| +10.00 D. | +4.50 D. | +5.75 D. |
| +12.00 D. | +4.00 D. | +6.75 D. |
| +14.00 D. | +5.00 D. | +7.00 D. | whereby the front base curve of a 60 mm lens is flattened to about +5.00 diopters at the edge and about +6.50 diopters for 53 mm lens and when added to the ocular correction the diopter drop per millmeter is between about 0.4 and 0.9.

4. An aphakic lens for an aphakic patient having a biconvex surface, the major portion of the correction being on the outer surface and a minor portion on the ocular surface, in which the peripheral asphericity rate of decay is calculated in accordance with the following Table:

| Front Base Curve | Power at Edge of a 60 mm Lens | Power at Edge of a 53 mm Lens |
| --- | --- | --- |
| +8.00 D. | +5.00 D. | +5.25 D. |
| +10.00 D. | +4.50 D. | +5.75 D. |
| +12.00 D. | +4.00 D. | +6.75 D. |
| +14.00 D. | +5.00 D. | +7.00 D. | whereby the front base curve of a 60 mm lens is flattened to about +5.00 diopters at the edge and about +6.50 diopters for 53 mm lens and when added to the ocular correction the diopter drop per millimeter is between about 0.4 and 0.9.

* * * * *